(12) United States Patent
Kim et al.

(10) Patent No.: US 11,048,735 B2
(45) Date of Patent: Jun. 29, 2021

(54) OPERATION OF A COMPUTER BASED ON OPTIMAL PROBLEM SOLUTIONS

(71) Applicant: INTERNATIONAL BUSINESS MACHINES CORPORATION, Armonk, NY (US)

(72) Inventors: Minkyong Kim, Scarsdale, NY (US); Min Li, San Jose, CA (US); Clifford A. Pickover, Yorktown Heights, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1235 days.

(21) Appl. No.: 14/956,459

(22) Filed: Dec. 2, 2015

(65) Prior Publication Data
US 2017/0161610 A1 Jun. 8, 2017

(51) Int. Cl.
*G06F 16/332* (2019.01)
*G06N 5/04* (2006.01)

(52) U.S. Cl.
CPC ........... *G06F 16/3329* (2019.01); *G06N 5/04* (2013.01)

(58) Field of Classification Search
None
See application file for complete search history.

(56) References Cited

U.S. PATENT DOCUMENTS

| 5,122,972 | A | | 6/1992 | Richards et al. |
| 5,369,575 | A | * | 11/1994 | Lamberti ............... G06F 17/274 704/9 |
| 6,327,579 | B1 | | 12/2001 | Crawford |
| 8,407,724 | B2 | | 3/2013 | Niazi |
| 8,843,851 | B1 | | 9/2014 | Gotchy et al. |
| 2004/0010358 | A1 | * | 1/2004 | Oesterling .......... B60R 16/0231 701/49 |

(Continued)

OTHER PUBLICATIONS

Feld, M. et al., "A model-based appraoch to the design and rendering of adaptive automotive user interfaces," GI-Jahrestangung (20012) pp. 2634-2648. (Year: 2013).*

(Continued)

*Primary Examiner* — Brian M Smith
(74) *Attorney, Agent, or Firm* — Law Office of Jim Boice

(57) ABSTRACT

A processor-implemented method, system, and/or computer program product improves operation of a computer. One or more processors receive a question from a user of a computer, which requests a solution to improve operations of the computer. Based on an interpretation derived from the context of the request, the processor(s) retrieve multiple child solution instances to the question, where the multiple child solution instances are derived from a parent solution instance. The processor(s) direct the computer to simultaneously display the multiple child solution instances on the computer, and then receive a selected child solution instance from the user. In response to receiving the selected child solution instance, the processor(s): discard other solution instances from the multiple child solution instances; designate the selected child solution instance as a primary solution instance; and store the primary solution instance. The processor(s) then direct execution of the primary solution instance.

18 Claims, 9 Drawing Sheets

(56) References Cited

U.S. PATENT DOCUMENTS

| | | | | |
|---|---|---|---|---|
| 2005/0221268 A1* | 10/2005 | Chaar | ...................... | G09B 7/02 |
| | | | | 434/350 |
| 2006/0070077 A1 | 3/2006 | Eriandson et al. | | |
| 2009/0028053 A1* | 1/2009 | Kannan | ................ | G06F 11/079 |
| | | | | 370/241 |
| 2009/0132918 A1 | 5/2009 | Deyo et al. | | |
| 2011/0055699 A1* | 3/2011 | Li | ........................ | G06F 16/951 |
| | | | | 715/709 |
| 2013/0007527 A1* | 1/2013 | Petukhov | ............ | G06F 11/0793 |
| | | | | 714/37 |
| 2013/0091413 A1* | 4/2013 | Doan | ...................... | G06F 17/24 |
| | | | | 715/227 |
| 2013/0177893 A1* | 7/2013 | Feng | .................. | G06F 17/2211 |
| | | | | 434/322 |
| 2013/0262142 A1* | 10/2013 | Sethumadhavan | ......................... | |
| | | | | G06F 19/3443 |
| | | | | 705/3 |
| 2015/0058679 A1* | 2/2015 | Jackson | .............. | G06F 11/3433 |
| | | | | 714/47.2 |
| 2016/0092552 A1* | 3/2016 | Morfonios | .............. | G06F 11/14 |
| | | | | 707/737 |
| 2017/0154114 A1* | 6/2017 | Lehodey | ............... | G06F 16/353 |

OTHER PUBLICATIONS

Lee, S. et al., "End-user perspectives of Internet connectivity problems," Computer Networks, vol. 56 (2012) pp. 1710-1722. (Year: 2012).*

P. Mell et al., "The NIST Definition of Cloud Computing", National Institute of Standards and Technology, Information Technology Laboratory, Sep. 2011, pp. 1-7.

Cypher, Allen (1993), "Watch What I Do: Programming by Demonstration", Daniel C. Halbert, MIT Press, ISBN 0-262-03213-9.

Lieberman, Henry (2001), "Your Wish Is My Command: Programming by Example", Ben Schneiderman, Morgan Kaufmann, ISBN 1-55860-688-2.

* cited by examiner

OPERATION OF A COMPUTER BASED ON OPTIMAL PROBLEM SOLUTIONS

BACKGROUND

The present disclosure relates to the field of computer systems, and specifically to the field of improving operation of computers. Still more particularly, the present disclosure relates to improving operation of a computer by implementing optimal solutions to problems with the computer.

SUMMARY

A processor-implemented method, system, and/or computer program product improves operation of a computer. One or more processors receive a question from a user of a computer, which requests a solution to improve operations of the computer. The processor(s) determine a context of the question in order to interpret the question. Based on an interpretation derived from the context, the processor(s) retrieve multiple child solution instances to the question, where the multiple child solution instances are derived from a parent solution instance. The processor(s) direct the computer to simultaneously display the multiple child solution instances on a display on the computer, and then receive a selected child solution instance from the user, where the selected child solution instance is selected by the user from the multiple child solution instances displayed on the computer. In response to receiving the selected child solution instance, the processor(s): discard other solution instances from the multiple child solution instances; designate the selected child solution instance as a primary solution instance; and store the primary solution instance. The processor(s) then direct execution of the primary solution instance to improve operations on the computer.

DETAILED DESCRIPTION

Figure 1:
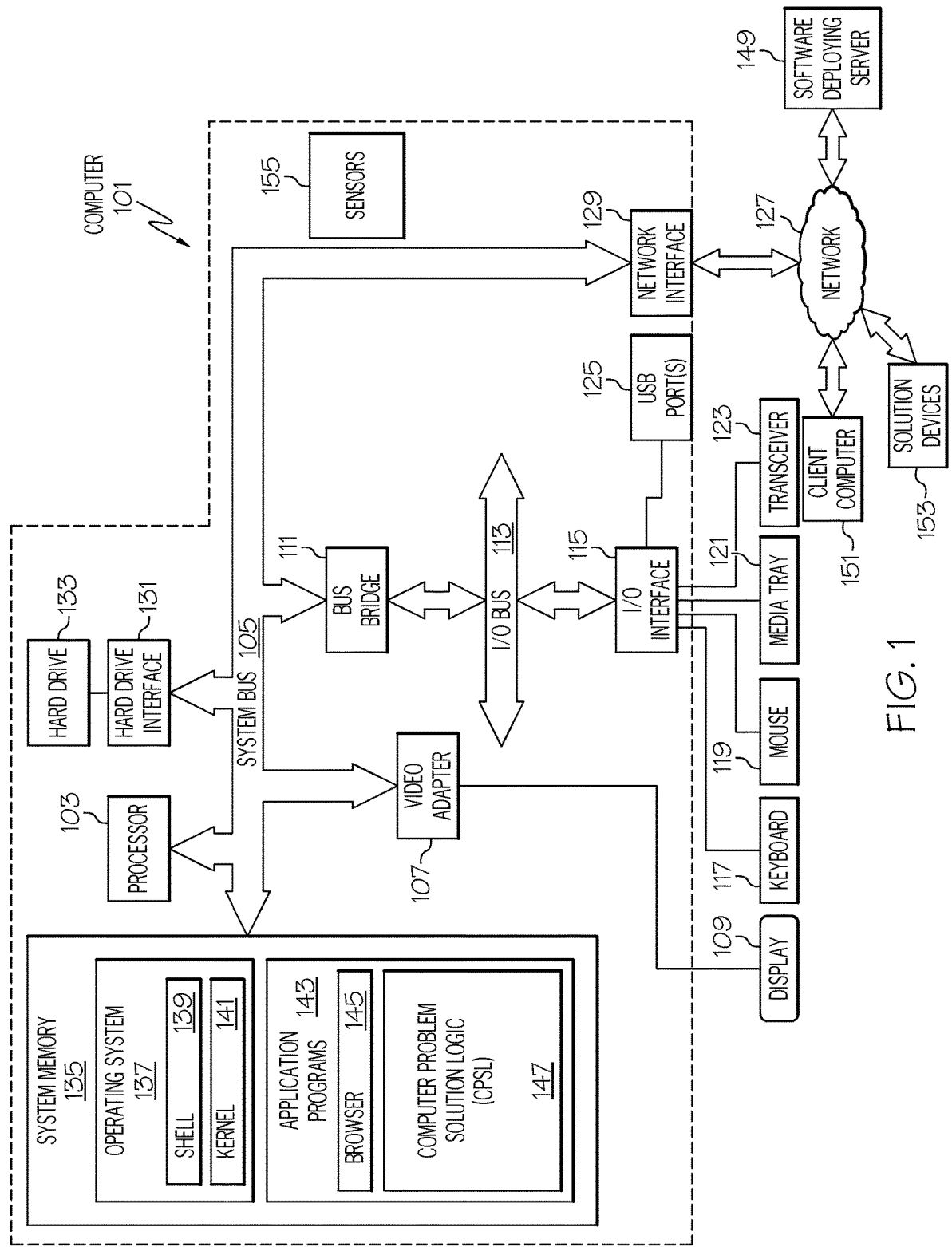
FIG. 1 depicts an exemplary system and network in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and in the implementation of the present invention. Note that some or all of the exemplary architecture, including both depicted hardware and software, shown for and within computer 101 may be utilized by software deploying server 149 and/or client computer 151 and/or solution devices 153 shown in FIG. 1.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 118, a media tray 121 (which may include storage devices such as CD-ROM drives, multi-media interfaces, etc.), a transceiver 123 (capable of transmitting and receiving electromagnetic (e.g., radio frequency, near field communication—NFC signals, etc.) signals), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or client computer 151 and/or solution devices 153 using a network interface 129. Network interface 129 is a hardware network interface, such as a network interface card (NIC), etc. Network 127 may be an external network such as the Internet, or an internal network such as an Ethernet or a virtual private network (VPN).

A hard drive interface 131 is also coupled to system bus 105. Hard drive interface 131 interfaces with a hard drive 133. In one embodiment, hard drive 133 populates a system memory 133, which is also coupled to system bus 105.

System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. Note that while shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other computer systems.

Application programs 143 in computer 101's system memory (as well as software deploying server 149's system memory) also include a Computer Problem Solution Logic (CPSL) 147. CPSL 147 includes code for implementing the processes described below, including those described in FIGS. 2-6. In one embodiment, computer 101 is able to download CPSL 147 from software deploying server 149, including in an on-demand basis, wherein the code in CPSL 147 is not downloaded until needed for execution. Note further that, in one embodiment of the present invention, software deploying server 149 performs all of the functions associated with the present invention (including execution of CPSL 147), thus freeing computer 101 from having to use its own internal computing resources to execute CPSL 147.

Solution devices 153 are devices that provide solutions to questions/problems/complaints related to client computer 151. For example, solution devices 153 may be webpage servers that provide interactive communications related to a particular problem, of they may be hardware devices that provide signals (e.g., reset signals) that correct a problem with client computer 151.

Within or associated with computer 101 are sensors 155. Sensors 155 are on-board hardware and/or software sensors that detect anomalous conditions on computer 101, such as overheating (e.g., of processor 103), full storage devices (e.g., hard drive 133 not having room to store any more data), data transmission errors (e.g., hardware problems in network interface 129 and/or network 127), etc.

Note that the hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Presented herein is a solution to computer problems that improves the operation of the computer. A user (and/or a hardware device within a computer) presents a question asking for help in solving a problem associated with the computer, including problems in the computer's hardware, applications, operating system, etc. In order to determine the scope of the problem for which the user is actually requesting help, the question is interpreted based on a context of the question, including the syntax of the question (if typed/spoken by the user), the operational history of the computer that is having a problem, sensors readings from the computer, etc.

Based on the interpretation of the question, the system automatically seeks several solutions, resulting in N multiple simulated solutions being presented to the user by spawning N concurrent child instances of a parent solution to the problem. In response to a user selecting one of the child instances, the other child instances are discarded and the selected child instance becomes the primary instance. The system then utilizes the selected child instance to respond to future occurrences of the problem that prompted the question for help from the user.

In an embodiment of the present invention, the presentation of N multiple simulated solutions to a user is controlled by cognitive characteristics of the user, as described below.

Often, users of application software desire solutions in order to solve problems or perform tasks associated with such application use. For example, a user may wish to solve a problem or accomplish a task associated with the use of a word processor, image-processing tool, spreadsheet tool, email app, etc. Perhaps a user needs an easy way to remove a hyperlink in the text in a document, to cycle through edits, to insert a special symbol, to better control pagination, to sort information in particular ways, to remove personal identity information in a document, etc. Perhaps there are many ways to boost image quality using an image-processing app. Perhaps various errors are being encountered.

Often, users manually search the Internet with a search engine to find answers to such questions/problems. These questions and possible answers are sometimes scattered in different discussion groups and at other sites. Sometimes, solutions are available in a "help" feature for the application. Many times, a user may find multiple solutions that have varying degrees of efficiency (e.g., number of steps needed to reach a solution) and with varying levels of risk (if performed incorrectly, content can be trashed and/or the computer can be damaged). Furthermore, some solutions may actually be wrong (e.g. for the version of an application being used). Some solutions may be voted on in discussion groups, and possibly better solutions may be labeled with more positive votes or comments. Sometimes, similar solutions may be found on the World Wide Web, and these may be "good enough" even if they do not completely solve a user's problem.

Figure 2:
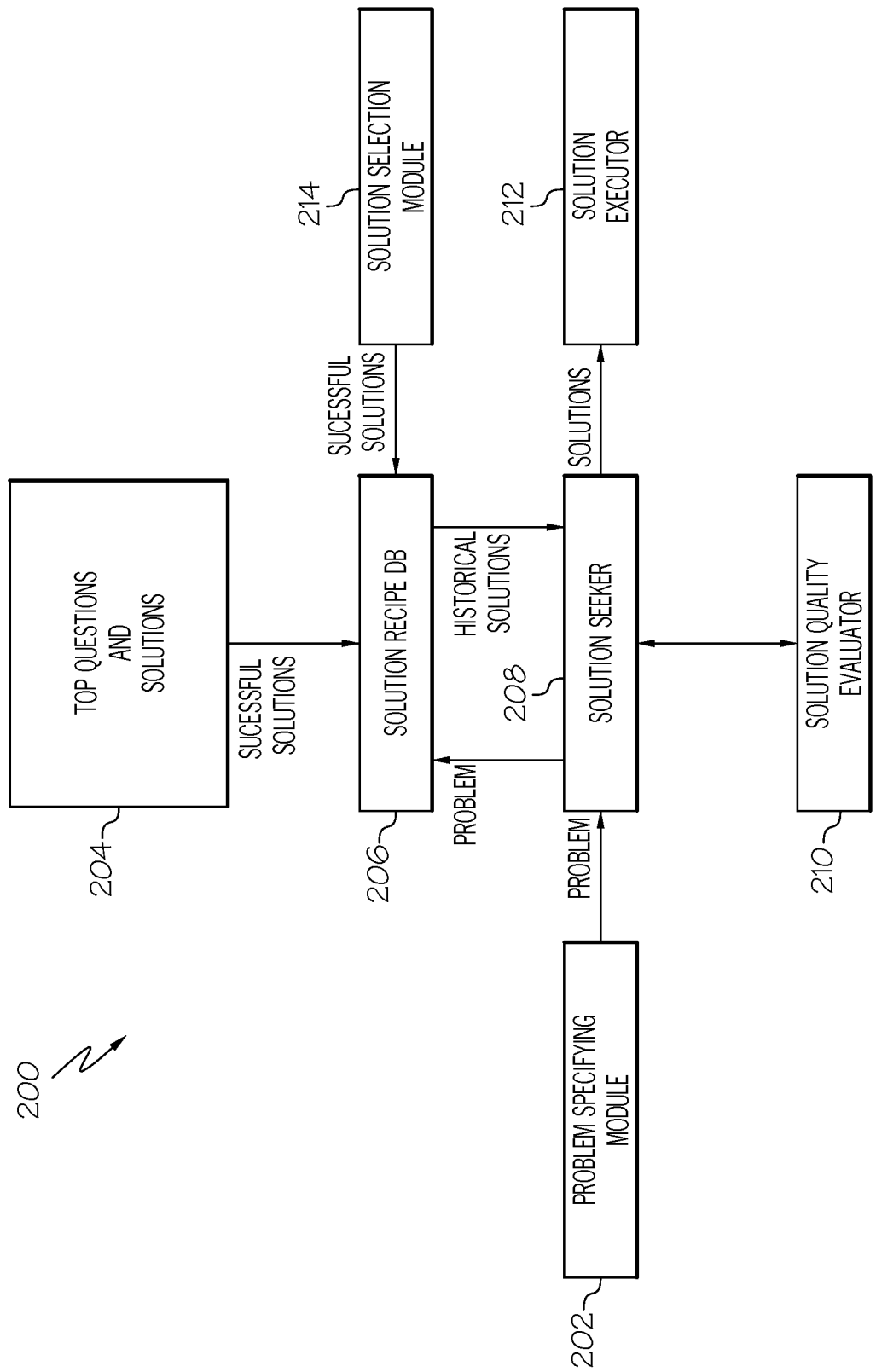
FIG. 2 illustrates an overview of system architecture utilized by the present invention.

With reference now to FIG. 2, an exemplary architecture 200 utilized in accordance with one or more embodiments of the present invention is presented. The various modules/blocks/boxes shown in FIG. 2 may be implemented one or more of the components shown in FIG. 1.

Architecture 200 includes the following exemplary components.

A problem-specifying module 202 assists users in specifying a desired result (e.g., application effects) for a computer. For example, assume that the user states "My computer is too slow". This may mean that his/her Internet service is slow; that the Internet connection on his/her computer is slow; that there are too many page swaps between memory and the hard drive, thus slowing down instruction executions; that the graphics card is not keeping up with gaming images and inputs on the display; etc. Thus, problem-specifying module 202 will determine what the actual problem is using one or more processes.

For example, sensors 155 shown in FIG. 1 may detect that a connection to the Internet provided by network interface 129 is poor, such that data is anomalously slow going to and from the Internet. If the user says "My computer is too slow", then the system will determine that the user is actually experiencing Internet issues.

Similarly, if the sensors 155 detect that a graphics processing unit (GPU—not shown in FIG. 1) is overheating, and that the user is running a graphics-heavy gaming program, then the system will conclude that "My computer is too slow" means that the graphics being displayed are jittery or gaming inputs are slow to be executed/displayed.

If the user inputs a message such as "This computer is awful!", then the system will examine what application program is running, the history of errors experienced by the user, etc., and may determine that the user is actually experiencing problems with that application program, which may or may not be caused by the platform (processor, operating system, etc.) on which the application program is running.

As shown in block 204, the most popular/highly rated solutions to questions/problems presented are retrieved from solution devices (e.g., solution devices 153 shown in FIG. 1) and are sent to a solution recipe database (block 206), which keeps track of a successful solutions to computer problems. This history of successful solutions comes from a user of the present computer experiencing a problem and/or other users of other computers. The solutions found may be from question-answer websites devoted to certain problems, discussion forums directed to certain problems, a local "help" function for the local computer and/or an application running on the local computer, etc.

As shown in block 208, a solution seeker generates N simulated solutions given the desired targets and current system state. For example, consider graphical user interface 301 shown in FIG. 3.

As shown in user input box 303, the user has typed in "I can't keep stuff working on my computer". The phrase "keep stuff working" is vague and ambiguous. That is, is the user unable to store photos and other files using his/her computer, or are applications refusing to stay open, or does the computer keep turning itself off or going into hibernation mode, etc.? The system (e.g., computer 101 shown in FIG. 1) begins by performing a natural language processing (NLP) operation to determine the context of "keep stuff working". In this simple example, the problem is with the "computer", as found in the user's complaint. The system then examines the current state of the user's computer (e.g., client computer 151 shown in FIG. 1), by looking at the state of the processor 103, read/write operations to the hard drive 133, input/output operations of the network interface 129, temperature and other sensor readings provided by sensors 155, etc. Based on these readings, the system determines 1)

that the problem is actually that the user is unable to store data, and 2) that the problem is caused by the hard drive 133 being full.

Figure 3:
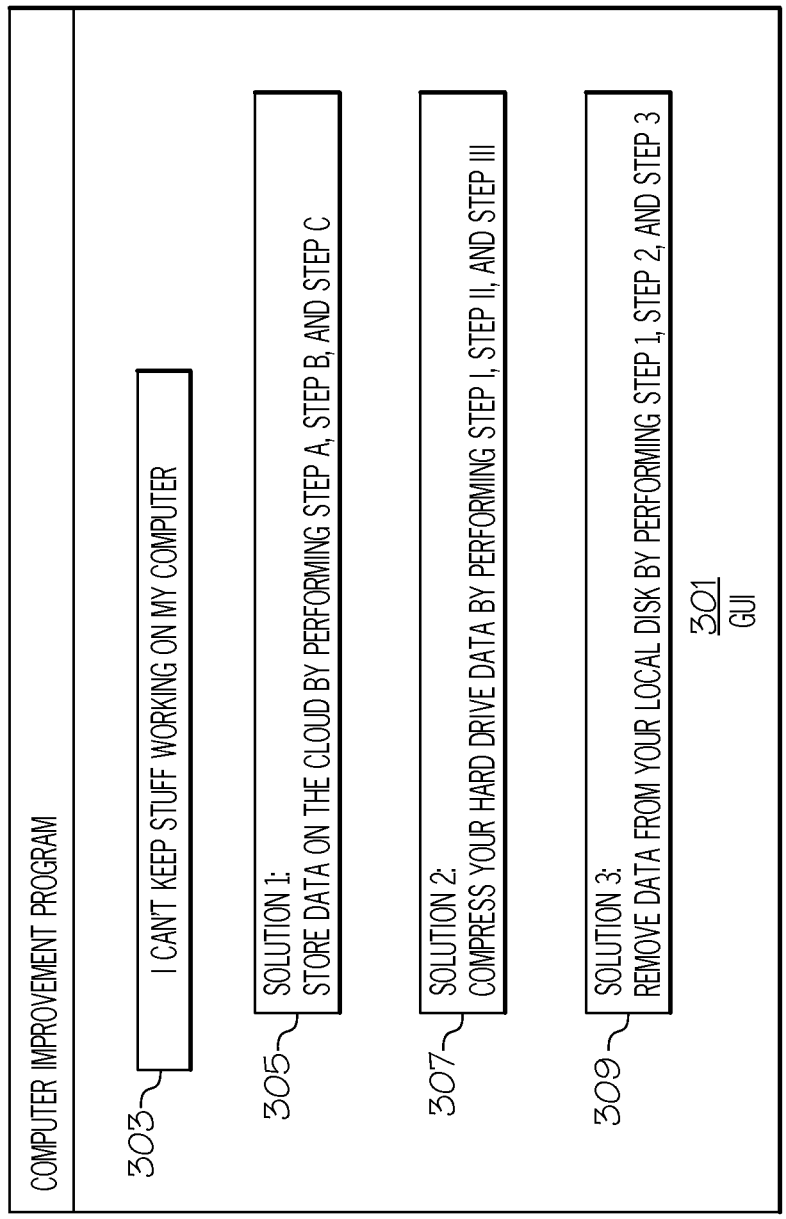
FIG. 3 depicts an exemplary graphical user interface (GUI) that presents ranked/sorted solutions to a problem with a computer.

As shown in FIG. 3, the system presents Solution 1 (displayed in block 305), Solution 2 (displayed in block 307), and Solution 3 (displayed in block 309). Solution 1 presents steps a-c for the user to perform in order to store the data on a remote storage service (e.g., a "cloud" of shared storage resources). Solution 2 presents steps I-III for the user to perform in order to compress the data on the hard drive, thus freeing up space. Solution 3 presents steps 1-3 for the user to perform in order to remove data from the local hard disk. Solutions 1-3 are displayed (from top to bottom) according to their ranking.

This ranking is based on successes achieved by other users/systems, and/or is based on potential harm to the system that may occur if the solution is implemented. For example, the solution quality evaluator shown in block 210 in FIG. 2 evaluates the solutions using NLP language and Deep Question/Answer techniques to calculate the success rate and confidence level of each solution. If more users of systems report successful results from Solution 1 than Solution 2, then Solution 1 is presented at the top of the list/blocks in FIG. 3. Furthermore, if the system determines that removing data from the hard disk (Solution 3) poses the greatest risk of damaging the client's computer and/or the operation of the client's computer (since erasing data may wipe out part of the OS, etc.), then Solution 3 is placed at the bottom of the list/blocks, as shown in FIG. 3.

As shown in block 212, a solution executor (e.g., computer 101 shown in FIG. 1) directs the client computer 151 to execute the solutions (e.g., one or more of Solutions 1-3 shown in FIG. 3).

As shown in block 214, the solution selection module (e.g., part of CPSL 147) displays a solution selection interface to a user (e.g., GUI 301 in FIG. 3) and applies the selected changes to the primary instance of the application. Once the user and/or client computer and/or system selects the solution to use, that selected solution becomes the primary solution instance, which will be used now and in the future by the client computer. The solution recipe database (block 206) then records the history and the successful solution in the client's computer to the solution recipe database.

As discussed above, a solution can be presented using natural language processing (NLP). For example, a user may type or verbally ask a question such as that shown in FIG. 3. As discussed herein, the seeking of a solution does not always have to be explicit, but can be gleaned through an analysis of the user experiencing trouble. For example, a user may be trying an option over and over, thus indicating that he/she is not obtaining a desired or expected result.

In some options, the user may specify a desired target by actually "showing" an example of a solution. For example, the user may be interested in formatting headers for sections of a document, and the user may number a single heading of a paper as an example target for numbering all headings in a word processor and making them bold. Using this information, the system may seek and display N concurrent solutions.

Figure 4:
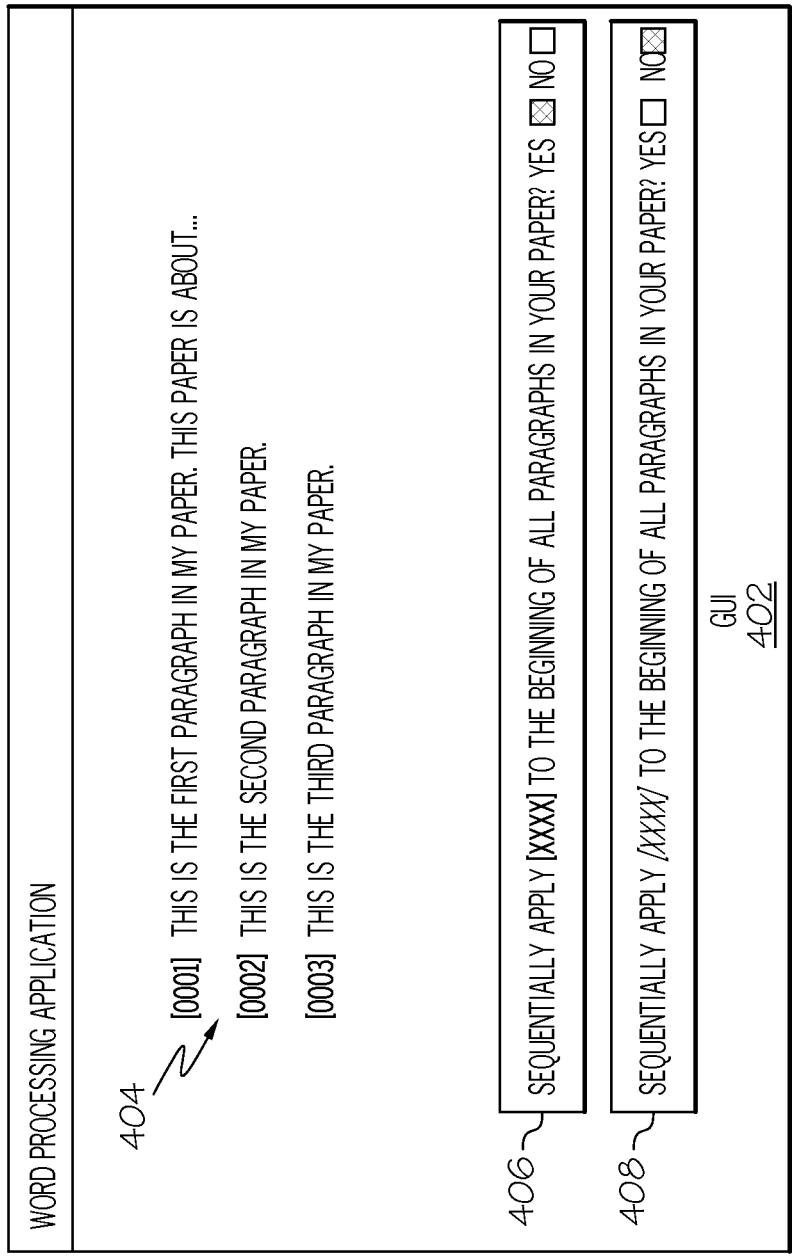
FIG. 4 illustrates an exemplary GUI used to implement a solution to a computer application based on an exemplary entry presented by the user.
Figure 5:
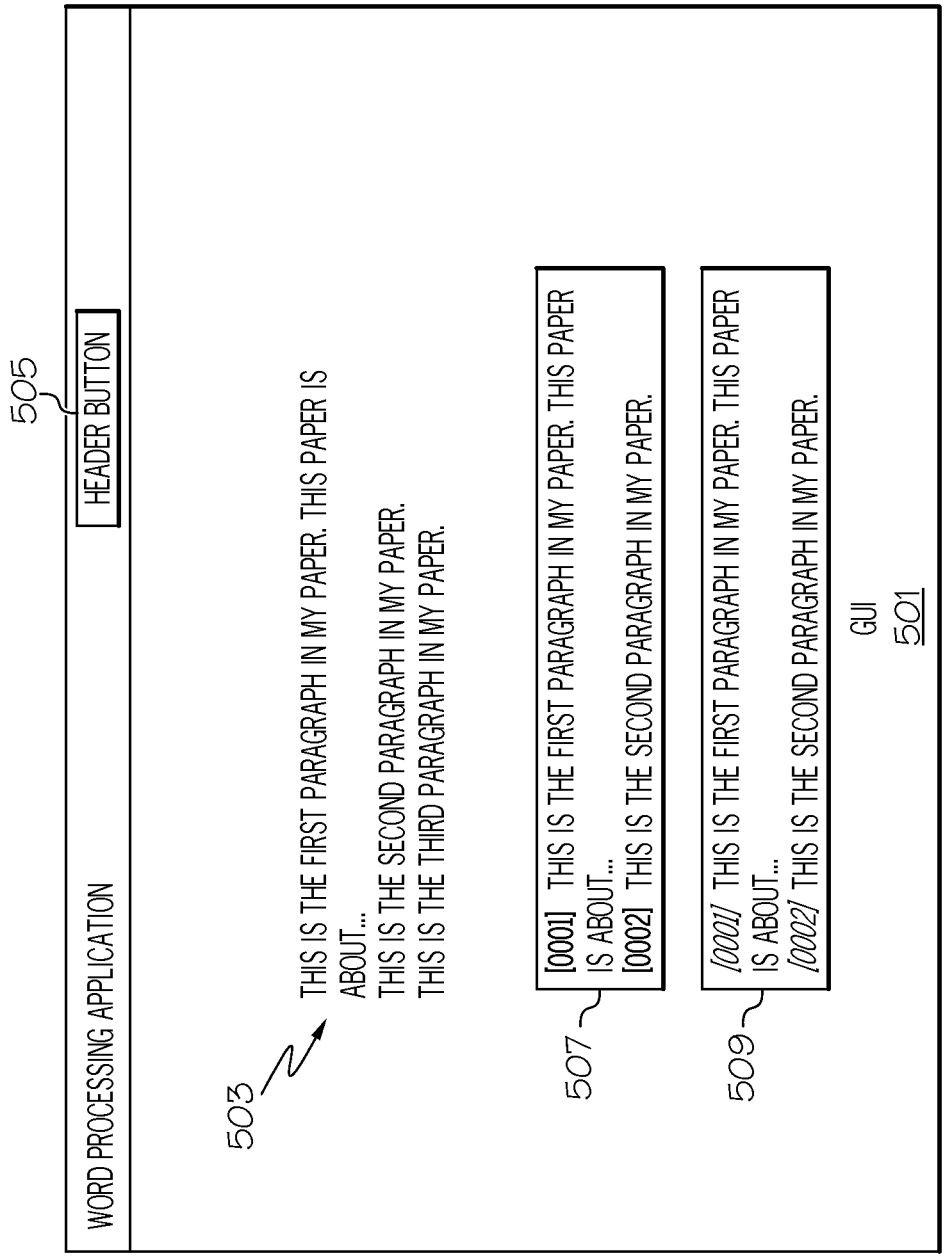
FIG. 5 depicts another exemplary GUI used to implement a solution to a computer application based on an exemplary entry presented by the user.

For example, consider GUI 402 shown in FIG. 4. Assume that a user has manually typed in the paragraph numbering/header "[xxxx]" (header 404) in front of a paragraph in a text document being handled by a word processing application. Assume further that, after typing in "[xxxx]" in front of one of the paragraphs, the user checked the "Yes" box in input block 406. This causes the system to auto-populate all paragraphs with a bold header with sequential numbering. If the user had clicked the "Yes" box in input block 408, then each of these headers would be in italics.

In an alternate embodiment, portions of the text would be simultaneous displayed on GUI 501, thus showing the user how the text would appear. That is, assume that a word processing application displays text 503. Assume that a user has clicked a header button 505. By clicking header button 505, box 507 pops up showing how the text 503 would appear with bold headers, and box 509 pops up showing how the text 503 would appear with italicized headers. By clicking box 507, box 507 and box 509 disappear, and text 503 is formatted with the headers shown in box 507 (as depicted for the first couple of paragraphs from text 503). Thus, the user will have a preview of how a particular operation will perform, and can select the operation he so desires. Once a user selects one of the N simulated solutions (e.g., shown in boxes 507 and 509), the client computer communicates this information to the system, such that this solution is recalled as being the preferred solution for future formatting.

In one embodiment of the present invention, the number N of solutions presented is based on cognitive characteristics of the user (e.g., the current distraction level of the user, the ability of a user to handle a particular nature and number of solutions, etc.). For example, some users may be able to handle and assess four presented solutions based on any of: user distraction level (e.g. as determined by number of open windows already on screen), the cohort of a user (fatigue level, experience level with a particular application or class of applications, history of use, job title, etc.), the size of screen being used (e.g. a large display vs. a small display), etc. On the other hand, an advanced user with a particular history may actually appreciate seeing eight presented solutions.

As described herein, an efficient "recipe" for achieving a goal may optionally be stored based on the solution selected by a user.

The possible quality of solutions can be estimated based on votes and comments in discussion groups or at other Web site. For example, perhaps there are ten possible solutions. The system may determine a confidence level associated with each potential solution and present and simulate the "best" of these possible solutions based on a confidence level. This confidence level may be increased by the votes and comments. In some cases, the system may use Natural Language Processing and DeepQA technology to determine a confidence level of possible solutions.

In one embodiment of the present invention, when the user chooses one solution among N, the state changes from the time when the "children" instances (each showing a solution) were created at time ($t\_s$) to the time of election ($t\_e$) as applied to the chosen solution instance. To support this mechanism, the events can be logged on the main instance (from $t\_s$ to $t\_e$) and replayed on the chosen instance. An alternative way is to apply the events/operations on the main instance to all the children instances in parallel. In this case, as soon as the user chooses a child instance, it immediately becomes the main instance without requiring the application of any events/operations. This mechanism allows users to change the action/operation/solution in a history of operations. In other existing systems, in order to change an action, which happened at time $t\_s$, a user needs to undo all the actions that happened after time $t\_s$. Using the present invention, the user can choose a different action/operation/solution, which happened at t_s, without undoing all the operations that followed (during the time between t_s and t_e).

As described herein, the input to the system (for example, a question posed by a user) can be supplemented with a receiving of data indicating application various run-time characteristics. If the question regards an error, there may also be a determining of the severity of errors associated with running the application. Optionally, the system may also determine if the application passes integrity checks. If the severity of application errors exceeds a predetermined threshold, this information may be used to control N, the number of simulated solutions.

In some cases, users may wish to be able to contribute to database of helpful solutions, such as often found in discussion groups.

To generate help information, tools may be incorporated into an application to enable users to capture information about the application as they are performing functions.

Optionally, a storage database can be used in conjunction with a composite application, including several application components. Thus, a storage container for each of the application components can be established in the computer system's storage database. The storage containers may be configured to store support information for each of the component applications, and this may be used when presenting the aforementioned N simulated solutions.

When a user is experiencing problems or having a problem to solve, a wizard can be used that includes dialogs for completing a task. In this case, the N simulated solutions can further involve opening several chat dialogs between the user and support specialists.

The various solutions can be displayed in separate windows on the display screen alongside information related to the task in hand. A help map function can be used to display concurrently, separately from the help text, a portion of a hierarchical map of the stored help texts and solutions, which are replaced by new help text and solutions corresponding to the selected map entry.

Figure 6:
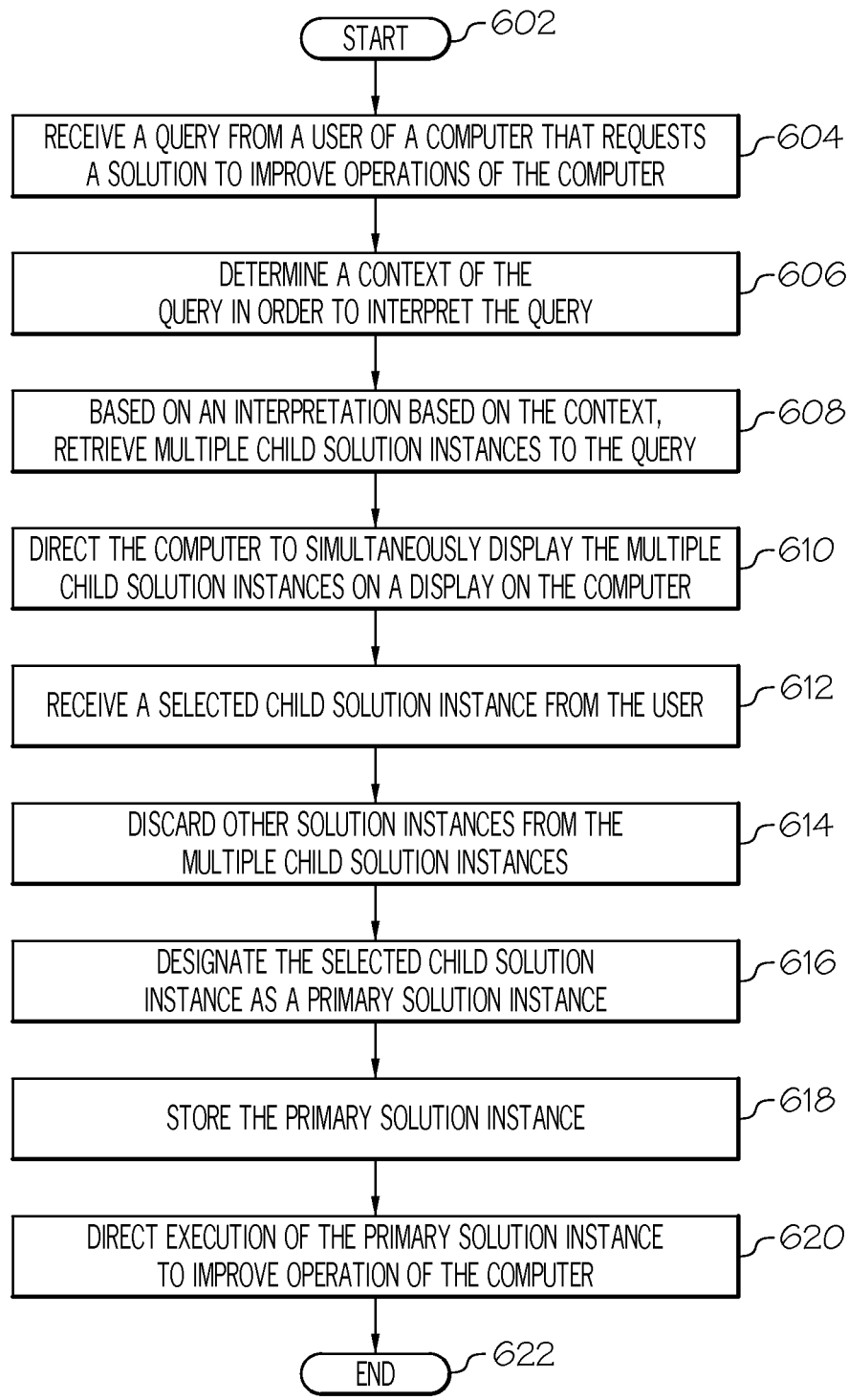
FIG. 6 is a high level flow chart of one or more steps performed by one or more processors and/or other hardware devices to improve an operation of a computer in accordance with one or more embodiments of the present invention.

With reference now to FIG. 6, a high level flow chart of one or more steps performed by one or more processors and/or other hardware devices to improve an operation of a computer in accordance with one or more embodiments of the present invention is presented.

After initiator block 602, one or more processors (e.g., computer 101 or client computer 151 shown in FIG. 1) receive a question from a user of a computer (e.g., client computer 151), where the question requests a solution to improve operations of the computer, as described in block 604 (see examples in FIG. 3). These questions may be in the form of a query ("How do I do something"), or they may be in the form of a complaint ("My computer is slow").

As described in block 606, the processor(s) determine a context of the question in order to interpret the question. As described herein, this context may be from the phrasing of the question, sensor readings from the client computer (e.g., overloaded CPU), an event history (e.g., repeated and yet ineffective keystrokes or other inputs), etc.

As described in block 608, based on an interpretation of the question derived from the context, the processor(s) retrieve multiple child solution instances to the question (e.g., Solutions 1-3 shown in FIG. 3). These multiple child solution instances are derived from a parent solution instance. That is, the parent solution may be "Solve data storage problem", and the child solution instances are the specific Solutions 1-3 shown in FIG. 3.

As described in block 610, the processor(s) direct the computer (or more specifically the display on the client's computer) to simultaneously display the multiple child solution instances (see FIG. 3).

As described in block 612, the processor(s) receive a selected child solution instance from the user, where the selected child solution instance is selected by the user from the multiple child solution instances displayed on the computer. For example, computer 101 in FIG. 1 may detect that the user of client computer 151 has clicked block 305 in FIG. 3. In response to receiving the selected child solution instance, the processor(s) discard other solution instances from the multiple child solution instances (block 614); designate the selected child solution instance as a primary solution instance (block 616); and store the primary solution instance (block 618). That is, the solution chosen by the user and/or the system is designated as the primary solution instance, and is then stored for immediate as well as future use to solve the problem posed by the question received from the client computer.

As described in block 620, the processor(s) then direct execution of the primary solution instance to improve operation of the computer. This direction may be in the form of automatically causing certain hardware events to occur (e.g., opening access to new storage devices, changing bandwidth settings on an interface, turning on more fans to cool the computer down, etc.), or the direction may be a set of instructions for the user to follow (see FIG. 3).

The flow chart ends at terminator block 622.

In one embodiment of the present invention, the question is received twice: once at a first time and then later at a second time. In this embodiment, when the processor(s) receive the question at the second time, they retrieve the primary solution instance that has been previously stored, and then execute the primary solution instance to respond to the question that was received at the second time.

In one embodiment of the present invention, the processor(s) determine the context of the question using natural language processing, where the natural language processing is used to determine a scope of the question based on the context of the question as described above.

In one embodiment of the present invention, the processor(s) receive sensor readings from sensors (e.g., sensors 155 shown in FIG. 1) in the computer. The sensor reading describes a state of the computer (e.g., disk capacity, temperature, bus capacity, I/O interface capacity, etc.). The processor(s) then determine the context of the question based on the sensor readings. That is, if the sensor detects that the client computer is overheating, and the question/complaint says "My computer is acting funny", then the sensor reading indicating that the computer is overheating provides the context that the CPU and other devices in the computer are operating outside of their nominal operating temperatures. Thus the context is for that of an overheating computer.

In one embodiment of the present invention, the processor(s) detect multiple repetitive inputs into the computer (e.g., the user repeatedly hits CTL-ALT-DEL in an attempt to reboot the computer, but to no avail). The processor(s) then determine that the multiple repetitive inputs are failed attempts by the user to correct a problem with the computer, and thus are able to determine the context of the question/complaint ("This computer is awful!") based on the multiple repetitive inputs into the computer.

In one embodiment of the present invention, the processor(s) determine a quantity N of the multiple child solution instances to be displayed based on cognitive characteristics of the user. That is, if the user is distracted, or has too many windows open, etc., then too many options will be overwhelming, and the quantity N of solutions will be reduced.

In one embodiment of the present invention, the processor(s) sort the multiple child solution instances for display based on a level of risk to the computer posed by execution of the multiple child solution instances. That is, solutions that could cause serious damage to the computer and/or its files are shown at the lowest recommended solution (e.g., Solution 3 in FIG. 3.)

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and improve resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
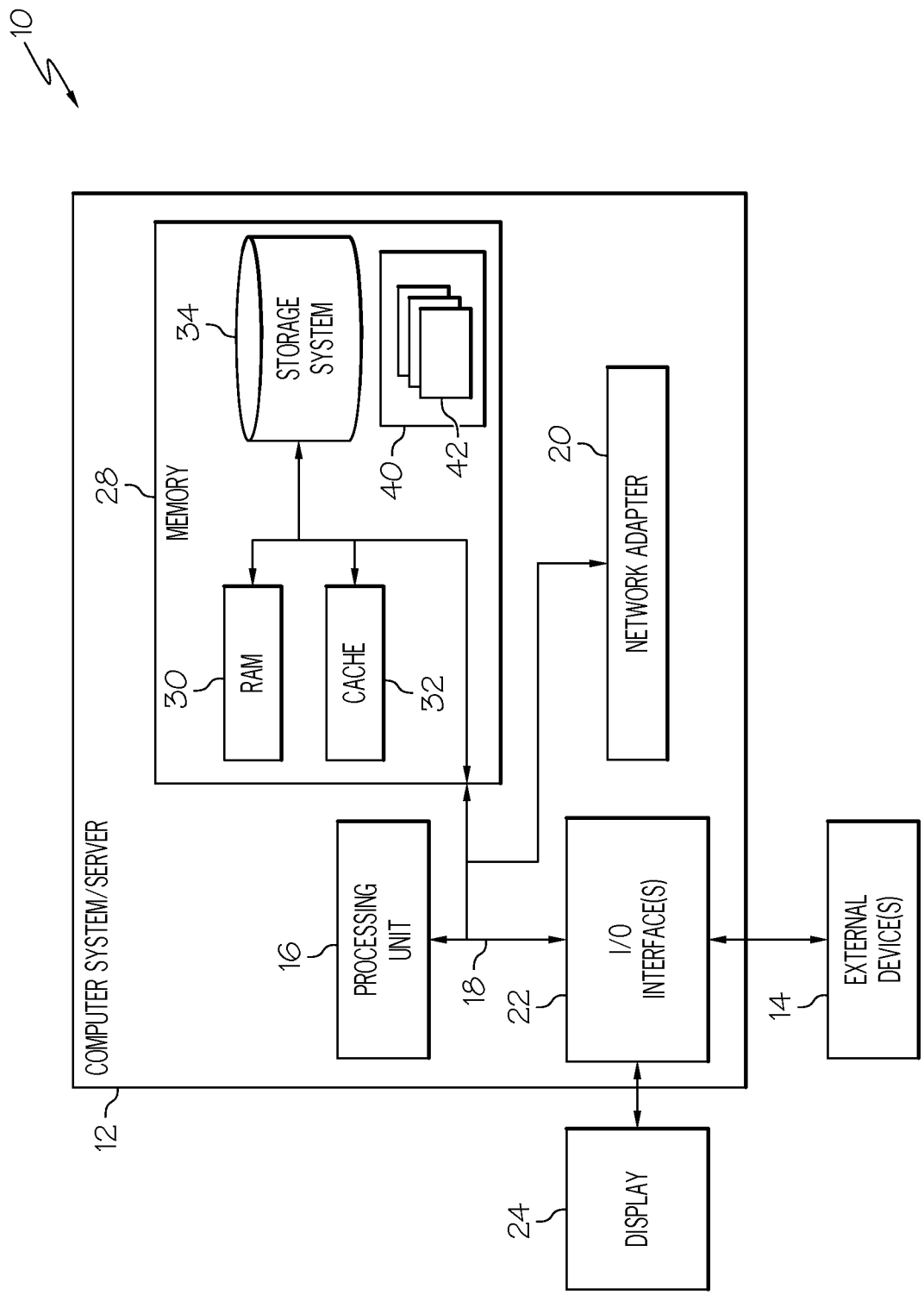
FIG. 7 depicts a cloud computing node according to an embodiment of the present disclosure.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 8:
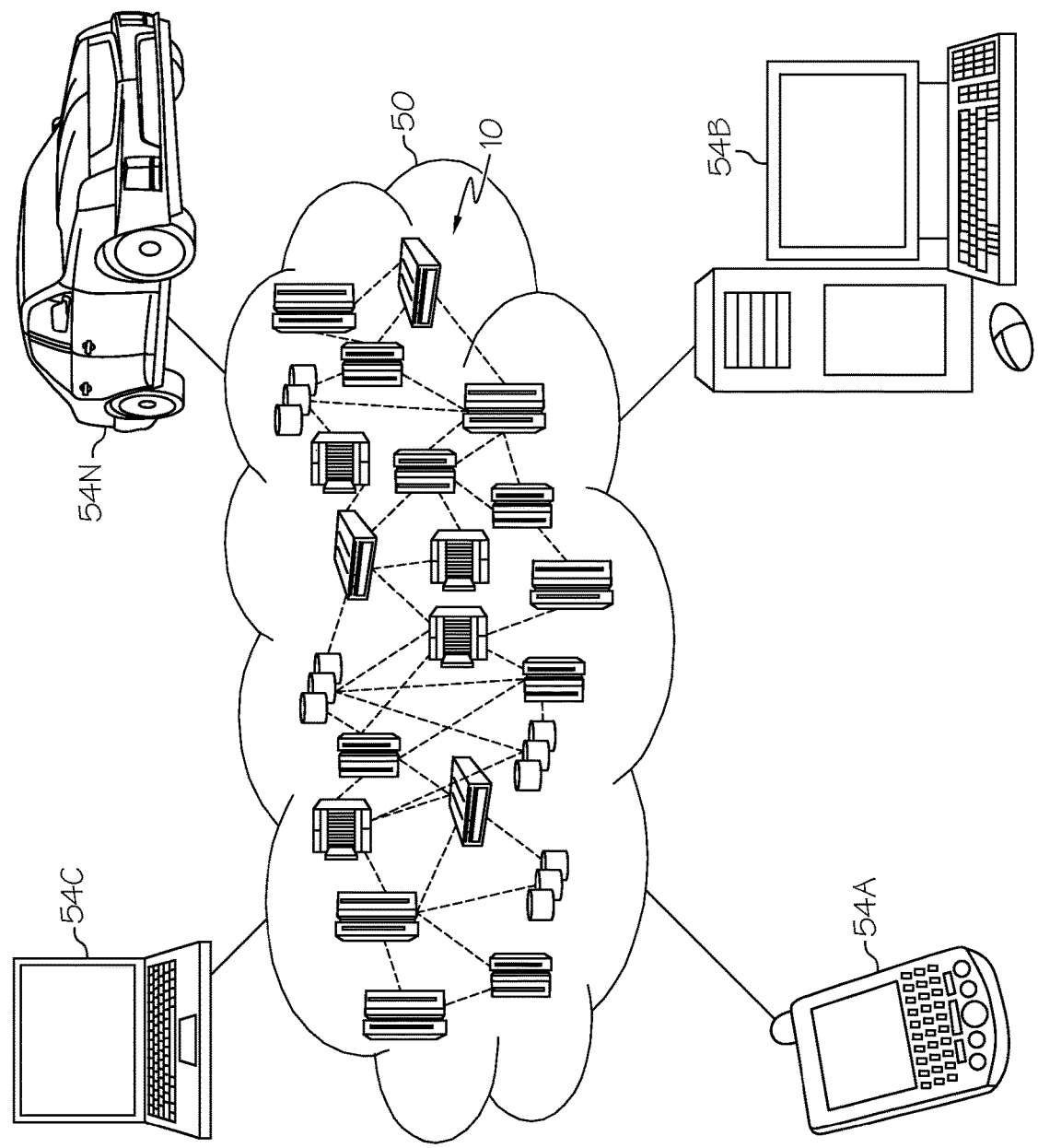
FIG. 8 depicts a cloud computing environment according to an embodiment of the present disclosure.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone MA, desktop computer MB, laptop computer 54C, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices MA-N shown in FIG. 8 are intended to be illustrative only and that computing nodes 10 and cloud computing environment 50 can communicate with any type of computerized device over any type of network and/or network addressable connection (e.g., using a web browser).

Figure 9:
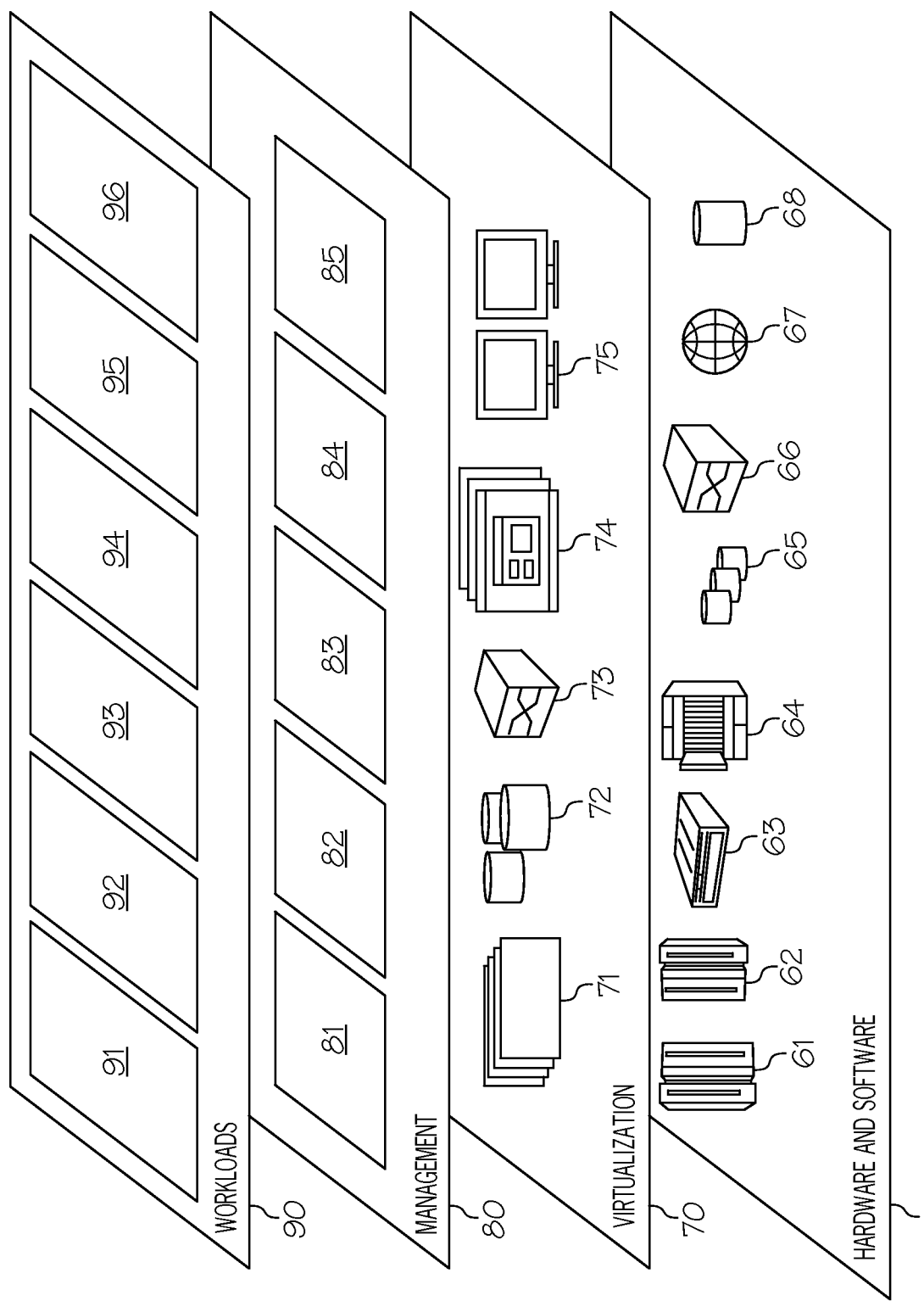
FIG. 9 depicts abstraction model layers according to an embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and computer improvement processing 96 (for improving a computer as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A processor-implemented method of improving operation of a computer, the processor-implemented method comprising:
   receiving, by one or more processors, a question from a user of a computer, wherein the question is a question that has multiple interpretations, and wherein the question requests a solution to improve operations of the computer;
   determining, by one or more processors, a context of the question in order to interpret a meaning of the question;
   based on an interpretation of the question derived from the context, retrieving, by one or more processors, multiple child solution instances to the question, wherein the multiple child solution instances are derived from a parent solution instance, and wherein each of the multiple child solution instances provides different detailed instructions for achieving the parent solution instance;
   identifying, by one or more processors, a quantity of open windows on a display on the computer when the question from the user of the computer is received;
   determining, by one or more processors, a level of distraction to the user caused by the quantity of open windows on the display on the computer when the question from the user is received;
   determining, by one or more processors, a quantity of the multiple child solution instances to be simultaneously displayed on the display on the computer based on the level of distraction to the user caused by the quantity of open windows on the display on the computer when the question from the user is received;
   receiving, by one or more processors, a selected child solution instance from the user, wherein the selected child solution instance is selected by the user from the multiple child solution instances displayed on the computer;
   in response to receiving the selected child solution instance, by one or more processors, designating the selected child solution instance as a primary solution instance; and
   directing, by one or more processors, execution of the primary solution instance to improve operation of the computer.

2. The processor-implemented method of claim 1, wherein the question is received at a first time, and wherein the processor-implemented method further comprises:
   receiving, by one or more processors, the question at a second time that is subsequent to the first time;
   retrieving, by one or more processors, the primary solution instance; and
   executing, by one or more processors, the primary solution instance to respond to the question that was received at the second time.

3. The processor-implemented method of claim 1, further comprising:
   determining, by one or more processors, the context of the question using natural language processing, wherein the natural language processing is used to determine a scope of the question based on the context of the question.

4. The processor-implemented method of claim 1, further comprising:
   receiving, by one or more processors, a sensor reading from a physical sensor in the computer, wherein the sensor reading describes a physical state of the computer; and determining, by one or more processors, the context of the question based on the sensor reading.

5. The processor-implemented method of claim 1, further comprising:
   detecting, by one or more processors, multiple repetitive inputs into the computer;
   determining, by one or more processors, that the multiple repetitive inputs are failed attempts by the user to correct a problem with the computer; and
   determining, by one or more processors, the context of the question based on the multiple repetitive inputs into the computer.

6. The processor-implemented method of claim 1, further comprising:
   sorting and displaying, by one or more processors, the multiple child solution instances for display based on a level of unintentional risk of damage to the computer posed by an intentional execution of the multiple child solution instances by the user of the computer.

7. The processor-implemented method of claim 1, wherein the question is in a form of a complaint about a speed of the computer, and wherein the processor-implemented method further comprises:
   detecting, by one or more processors, that a connection to an Internet from the computer is a faulty connection to the Internet, thus resulting in anomalous movement rates of data between the computer and the Internet as compared to nominal movement rates of data between the computer and the Internet;
   receiving, by one or more processors, the complaint about the speed of the computer; and
   determining, by one or more processors, that the complaint about the speed of the computer is about an Internet connection performance issue by the computer based on the faulty connection to the Internet.

8. The processor-implemented method of claim 1, further comprising:
   receiving, by one or more processors, a sensor reading from a sensor in the computer, wherein the sensor reading describes an overloaded component of the computer; and
   determining, by one or more processors, the context of the question based on the sensor reading.

9. The processor-implemented method of claim 1, further comprising:
   identifying, by one or more processors, a current cognitive characteristic of the user; and
   determining, by one or more processors, the context of the question based on the current cognitive characteristic of the user.

10. The processor-implemented method of claim 1, wherein the question from the user is about formatting paragraph numbering in a text, and wherein the processor-implemented method further comprises:
    displaying, by one or more processors, multiple options for formatting paragraph numbering in the text, wherein each of the multiple options show a portion of the text being formatted with a different option from the multiple options, and wherein each of the multiple options is displayed in a different input block;
    receiving, by one or more processors, a selected option from the user, wherein the selected option is from the multiple options, and wherein the selected option is selected by clicking a selection box; and
    formatting, by one or more processors, all of the text using the selected option.

11. The processor-implemented method of claim 1, further comprising:
    receiving, by one or more processors, a complaint about the computer from the user;
    identifying, by one or more processors, an application program that is running on the computer while the user issues the complaint;
    identifying, by one or more processors, a history of errors experienced by the user while using the application program;
    determining, by one or more processors, that the complaint about the computer is caused by the application program; and
    identifying, by one or more processors, a solution instance that resolves the complaint that is caused by the application program as the primary solution instance to improve the operation of the computer.

12. A computer program product for improving operation of a computer, the computer program product comprising a non-transitory computer readable storage medium having program code embodied therewith, the program code readable and executable by a processor to perform a method comprising:
    receiving a question from a user of a computer, wherein the question is a question that has multiple interpretations, and wherein the question requests a solution to improve operations of the computer;
    determining a context of the question in order to interpret a meaning of the question;
    based on an interpretation of the question derived from the context, retrieving multiple child solution instances to the question, wherein the multiple child solution instances are derived from a parent solution instance, and wherein each of the multiple child solution instances provides different detailed instructions for achieving the parent solution instance;
    identifying a quantity of open windows on a display on the computer when the question from the user of the computer is received;
    determining a level of distraction to the user caused by the quantity of open windows on the display on the computer when the question from the user is received;
    determining a quantity of the multiple child solution instances to be simultaneously displayed on the display on the computer based on the level of distraction to the user caused by the quantity of open windows on the display on the computer when the question from the user is received;
    receiving a selected child solution instance from the user, wherein the selected child solution instance is selected by the user from the multiple child solution instances displayed on the computer;
    in response to receiving the selected child solution instance, designating the selected child solution instance as a primary solution instance; and
    directing an execution of the primary solution instance to improve operation of the computer.

13. The computer program product of claim 12, wherein the question is received at a first time, and wherein the method further comprises:
    receiving the question at a second time that is subsequent to the first time;
    retrieving the primary solution instance; and
    executing the primary solution instance to respond to the question that was received at the second time.

14. The computer program product of claim 12, wherein the method further comprises:
determining the context of the question using natural language processing, wherein the natural language processing is used to determine a scope of the question based on the context of the question.

15. The computer program product of claim 12, wherein the method further comprises:
receiving a sensor reading from a sensor in the computer, wherein the sensor reading describes a state of the computer; and
determining the context of the question based on the sensor reading.

16. The computer program product of claim 12, wherein the method further comprises:
detecting multiple repetitive inputs into the computer;
determining that the multiple repetitive inputs are failed attempts by the user to correct a problem with the computer; and
determining the context of the question based on the multiple repetitive inputs into the computer.

17. The computer program product of claim 12, wherein the method further comprises:
sorting and displaying the multiple child solution instances based on a level of risk to the computer posed by execution of each of the multiple child solution instances.

18. A computer system comprising:
a processor, a computer readable memory, and a non-transitory computer readable storage medium;
first program instructions to receive a question from a user of a computer, wherein the question is a question that has multiple interpretations, and wherein the question requests a solution to improve operations of the computer;
second program instructions to determine a context of the question in order to interpret a meaning of the question;
third program instructions to, based on an interpretation of the question derived from the context, retrieve multiple child solution instances to the question, wherein the multiple child solution instances are derived from a parent solution instance, and wherein each of the multiple child solution instances provides different detailed instructions for achieving the parent solution instance;
fourth program instructions to identify a quantity of open windows on a display on the computer when the question from the user of the computer is received;
fifth program instructions to determine a level of distraction to the user caused by the quantity of open windows on the display on the computer when the question from the user is received;
sixth program instructions to determine a quantity of the multiple child solution instances to be simultaneously displayed on the display on the computer based on the level of distraction to the user caused by the quantity of open windows on the display on the computer when the question from the user is received;
seventh program instructions to receive a selected child solution instance from the user, wherein the selected child solution instance is selected by the user from the multiple child solution instances displayed on the computer;
eighth program instructions to, in response to receiving the selected child solution instance, designate the selected child solution instance as a primary solution instance; and
ninth program instructions to direct an execution of the primary solution instance to improve operation of the computer; and wherein
the first, second, third, fourth, fifth, sixth, seventh, eighth, and ninth program instructions are stored on the non-transitory computer readable storage medium for execution by one or more processors via the computer readable memory.

* * * * *